(12) United States Patent
Viswaraj

(10) Patent No.: US 12,134,355 B2
(45) Date of Patent: Nov. 5, 2024

(54) ENERGY ATTENUATING DISPLAY MOUNT FOR DASH MOUNTED VEHICLE DISPLAY

(71) Applicant: GM Global Technology Operations LLC, Detroit, MI (US)

(72) Inventor: Obuliraj Viswaraj, Tamil Nadu (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 121 days.

(21) Appl. No.: 17/847,278

(22) Filed: Jun. 23, 2022

(65) Prior Publication Data

US 2023/0415663 A1 Dec. 28, 2023

(51) Int. Cl.
*B60R 11/02* (2006.01)
*B60K 35/50* (2024.01)
*B60R 11/00* (2006.01)

(52) U.S. Cl.
CPC .......... *B60R 11/0235* (2013.01); *B60K 35/50* (2024.01); *B60R 2011/0005* (2013.01); *B60R 2011/005* (2013.01)

(58) Field of Classification Search
CPC ......................... B60K 2370/152; B60K 37/04; B62D 29/004; B60R 11/0235; B60R 2011/0005; B60R 2011/005; B60R 11/0229; B60R 2011/0084; B60R 21/045; F16F 1/3732
USPC ............................. 296/37.12, 70, 72, 187.03
See application file for complete search history.

(56) References Cited

U.S. PATENT DOCUMENTS

| | | | | |
|---|---|---|---|---|
| 3,894,750 A * | 7/1975 | Eckels | ................... | B60R 21/33 222/5 |
| 6,244,553 B1 * | 6/2001 | Wang | ................. | F16M 11/2021 379/454 |
| 6,669,274 B2 * | 12/2003 | Barnard | .................. | B60R 19/52 411/389 |
| 7,300,024 B2 * | 11/2007 | Slatosch | ............. | B60R 11/0235 248/371 |
| 7,610,783 B2 * | 11/2009 | Rudduck | ................. | E05B 83/34 70/277 |
| 8,672,383 B2 * | 3/2014 | Crane | ................... | B62D 27/00 296/29 |
| 10,525,899 B2 * | 1/2020 | Mullen | ............... | B60R 11/0235 |
| 11,235,710 B1 * | 2/2022 | Shumaker | ............. | B60K 35/00 |
| 11,458,907 B2 * | 10/2022 | Michel | .................. | F16B 5/0628 |
| 11,648,984 B2 * | 5/2023 | Inoue | ..................... | B62D 25/14 296/187.09 |
| 2014/0125085 A1 * | 5/2014 | Wakibayashi | ......... | B60K 37/02 296/70 |

(Continued)

FOREIGN PATENT DOCUMENTS

DE 102013016805 A1 * 4/2015 ............ B60R 11/02
JP 2013047075 A * 3/2013
JP 2013082362 A * 5/2013

*Primary Examiner* — Pinel E Romain
(74) *Attorney, Agent, or Firm* — CANTOR COLBURN LLP

(57) ABSTRACT

An energy attenuating vehicle display mount includes an instrument panel support mounted to a dashboard, an instrument panel support bracket coupled to the instrument panel support, a display mount coupled to the instrument panel support bracket, and an energy attenuating fastener connecting the display mount to the instrument panel support bracket. The energy attenuating fastener accommodates movement of the display mount relative to the instrument panel support bracket.

12 Claims, 4 Drawing Sheets

(56) References Cited

U.S. PATENT DOCUMENTS

| | | | |
|---|---|---|---|
| 2016/0193923 A1* | 7/2016 | Kim | B60R 11/0235 |
| | | | 296/70 |
| 2017/0232844 A1* | 8/2017 | Sugiyama | B60R 11/00 |
| | | | 248/27.1 |
| 2018/0348869 A1* | 12/2018 | Hentschel | G06F 3/016 |
| 2021/0206271 A1* | 7/2021 | Matthews | B60K 35/00 |
| 2022/0227307 A1* | 7/2022 | Shout | B60R 21/045 |
| 2023/0097623 A1* | 3/2023 | Harmon | B60N 3/002 |
| | | | 296/37.12 |
| 2023/0136911 A1* | 5/2023 | Nukui | B60N 2/763 |
| | | | 296/24.34 |
| 2023/0182568 A1* | 6/2023 | Seo | B60K 37/04 |
| | | | 361/808 |

* cited by examiner

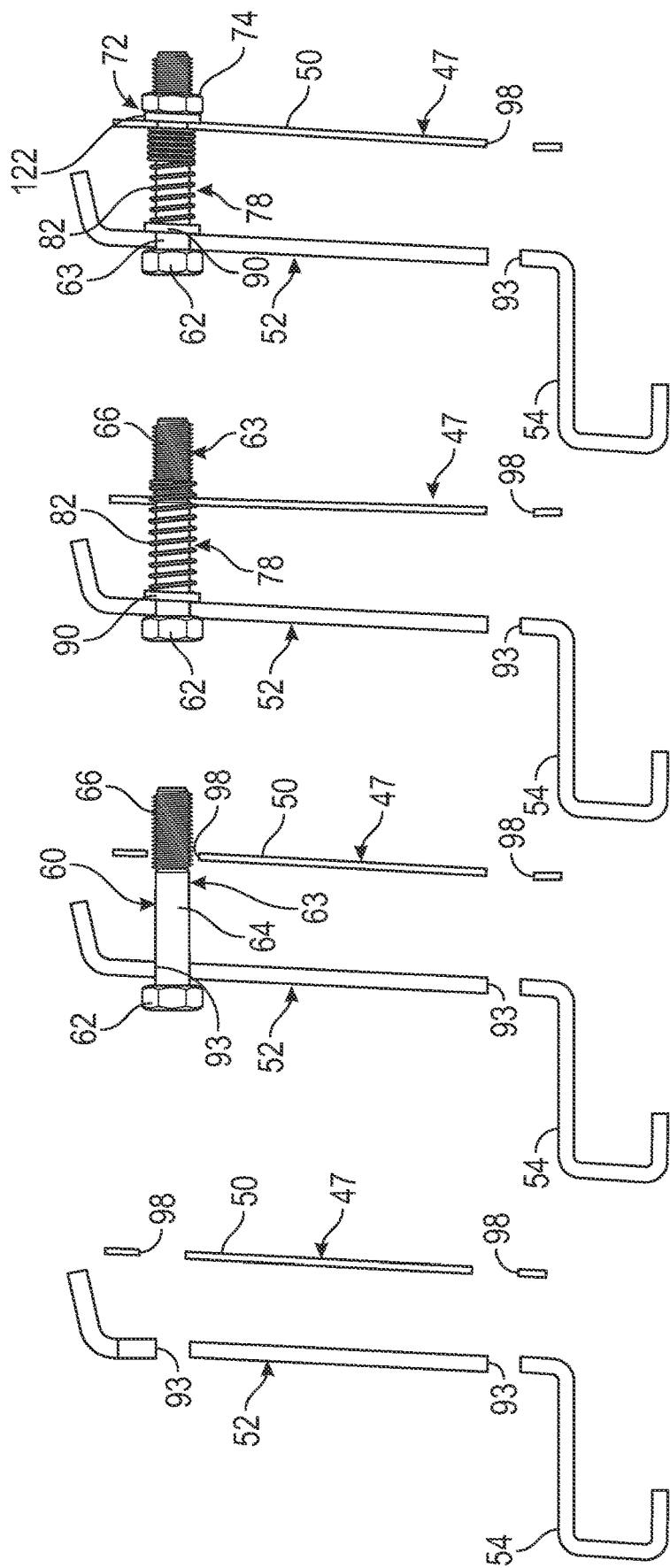

ENERGY ATTENUATING DISPLAY MOUNT FOR DASH MOUNTED VEHICLE DISPLAY

INTRODUCTION

The subject disclosure relates to the art of vehicles and, more particularly, to an energy attenuating display mount for dashboard mounted vehicle displays.

Vehicles include a display and/or instrument gauges that provide a driver with various information. Older vehicles may include analog displays including instrument gauges having an indicator that indicates speed, fuel remaining, battery failures and the like. More modern displays are digital and provide a great deal more information than their predecessors. In addition to vehicle speed, modern displays may indicate engine speed, gas mileage, fuel consumption, direction, oil temperature, battery life, as well as a host of additional data. Initially, the display and/or instrument gauges were arranged on a dashboard behind a steering wheel. As such, contact with a driver during a crash was unlikely even after a steering column collapse.

As the amount of information increased, so did display size, display number, and display location. Thus, in addition to displays arranged behind the steering wheel, additional displays may be arranged more centrally along the dashboard. As such, displays are now more prone to being struck by a driver and, given their centralized location, by a passenger during a crash event. Accordingly, it is desirable to provide a vehicle display, particularly a display not arranged behind a steering wheel, with an energy attenuating mount that mitigates contact forces during a crash.

SUMMARY

In a non-limiting example, an energy attenuating vehicle display mount includes an instrument panel support mounted to a dashboard, an instrument panel support bracket coupled to the instrument panel support, a display mount coupled to the instrument panel support bracket, and an energy attenuating fastener connecting the display mount to the instrument panel support bracket. The energy attenuating fastener accommodates movement of the display mount relative to the instrument panel support bracket.

In addition to one or more of the features described herein the energy attenuating fastener includes a fastener member and a biasing member.

In addition to one or more of the features described herein the display mount includes a first opening having a first diameter and the instrument panel support bracket a second opening having a second diameter, the energy attenuating fastener extending through each of the first opening and the second opening.

In addition to one or more of the features described herein the biasing member comprises a coil spring having a third diameter that is less than the second diameter and greater than the first diameter.

In addition to one or more of the features described herein the energy attenuating fastener includes a travel limiter arranged at the second opening, the travel limiter having a fourth diameter that is greater than the second diameter.

In addition to one or more of the features described herein the energy attenuating fastener includes a threaded section and the travel limiter includes a threaded portion that engages with the threaded section.

In addition to one or more of the features described herein the coil spring abuts each of the display mount and the travel limiter.

In addition to one or more of the features described herein the coil spring includes a plurality of active coils and a plurality of compressed coils.

In another non-limiting example, a vehicle includes a body defining a passenger compartment, a plurality of wheels supporting the body, a seat arranged in the passenger compartment, a dashboard arranged in the passenger compartment, and a steering control arranged between the seat and the dashboard. The steering control is connected to at least one of the plurality of wheels. A display is supported by the dashboard. The display is laterally offset relative to the steering control. An energy attenuating mount connects the display to the dashboard. The energy attenuating mount includes an instrument panel support mounted to the dashboard, an instrument panel support bracket coupled to the instrument panel support, a display mount coupled to the instrument panel support bracket, and an energy attenuating fastener connecting the display mount to the instrument panel support bracket. The energy attenuating fastener accommodates movement of the display mount relative to the instrument panel support bracket.

In addition to one or more of the features described herein the energy attenuating fastener includes a fastener member and a biasing member.

In addition to one or more of the features described herein the display mount includes a first opening having a first diameter and the instrument panel support bracket includes a second opening having a second diameter, the energy attenuating fastener extending through each of the first opening and the second opening.

In addition to one or more of the features described herein the biasing member comprises a coil spring having a third diameter that is less than the second diameter and greater than the first diameter.

In addition to one or more of the features described herein the energy attenuating fastener includes a travel limiter arranged at the second opening, the travel limiter having a fourth diameter that is greater than the second diameter.

In addition to one or more of the features described herein the energy attenuating fastener includes a threaded section and the travel limiter includes a threaded portion that engages with the threaded section.

In addition to one or more of the features described herein the coil spring abuts each of the display mount and the travel limiter.

In addition to one or more of the features described herein the coil spring includes a plurality of active coils and a plurality of compressed coils.

In another non-limiting example, a method of mounting a display in a vehicle includes positioning a display mount adjacent an instrument panel support bracket coupled to a dashboard, passing an energy attenuating fastener through first opening in the display mount and a second opening in the instrument panel support, installing a biasing member through the second opening onto the energy attenuating fastener, and securing the biasing member with a travel limiter coupled to the energy attenuating fastener at the second opening.

In addition to one or more of the features described herein securing the biasing member includes threading the travel limiter onto the energy attenuating fastener.

In addition to one or more of the features described herein threading the travel limiter onto the energy attenuating fastener includes compressing the biasing member to form a plurality of compressed coils and a plurality of active coils.

In addition to one or more of the features described herein the method also includes connecting a display to the display mount.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 7A is a side view of the display mount being positioned relative to the instrument panel support bracket, in accordance with a non-limiting example;

FIG. 7B is a side view of a fastener member of the energy attenuating fastener passing through the display mount and the instrument panel support bracket, in accordance with a non-limiting example;

FIG. 7C is a side view of a biasing member of the energy attenuating fastener being installed through the instrument panel support bracket onto the fastener member, in accordance with a non-limiting example; and FIG. 7D is a side view of a fastener element being connected to the fastener member of the energy attenuating fastener, in accordance with a non-limiting example.

DETAILED DESCRIPTION

Figure 1:
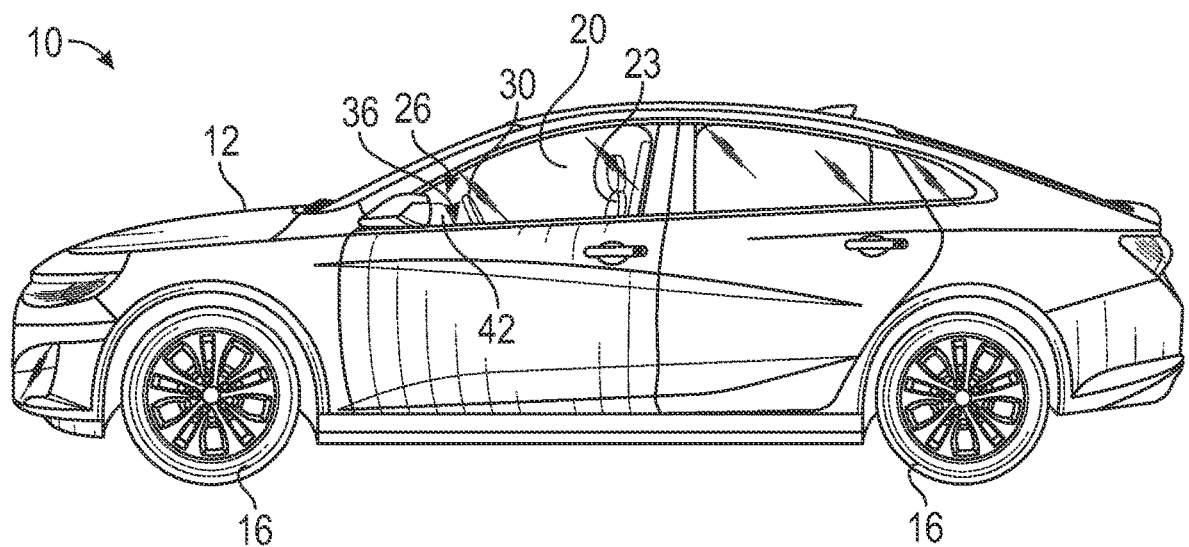
FIG. 1 is a side view of a vehicle including an energy attenuating display mount, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. At least one of the plurality of wheels 16 is a steerable wheel. That is, changing a position of at least the one of the plurality of wheels 16 relative to body 12 will cause vehicle 10 to change direction. In the non-limiting example shown, both front wheels (not separately labeled) of the plurality of wheels 16 are steerable. Body 12 defines, in part, a passenger compartment 20 having seats 23 positioned behind a dashboard 26. A steering control 30 is arranged between seats 23 and dashboard 26. Steering control 30 is operated to control orientation of the steerable wheel(s). A display 36 is supported by dashboard 26.

Figure 2:
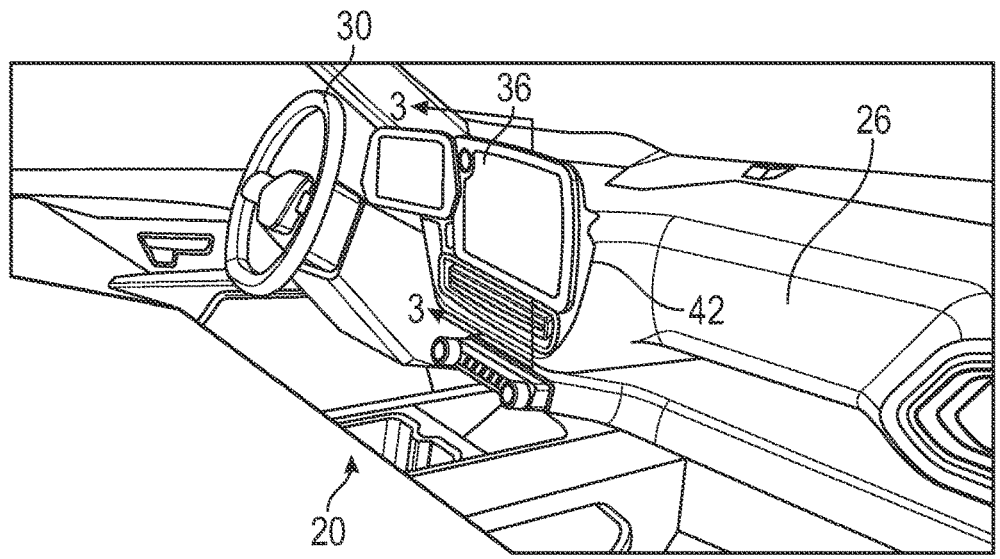
FIG. 2 is a partial perspective view of a passenger compartment of the vehicle of FIG. 1 illustrating the energy attenuating display mount secured to a dashboard, in accordance with a non-limiting example.
Figure 3:
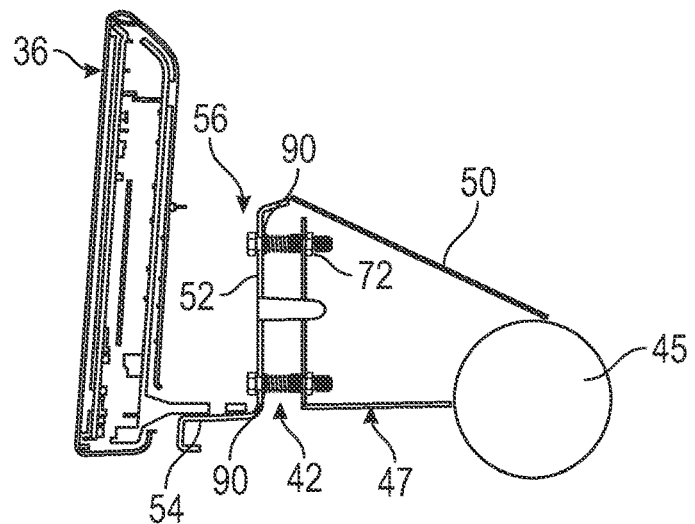
FIG. 3 is a side plan view of the energy attenuating display mount of FIG. 2, in accordance with a non-limiting example.
Figure 4:
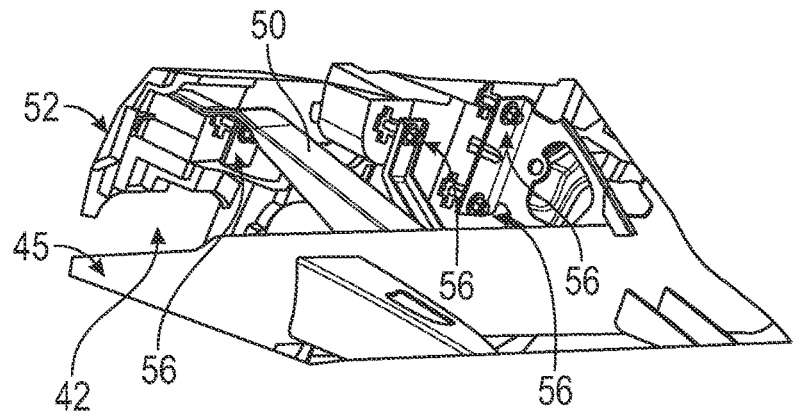
FIG. 4 is a partial rear perspective view of a display mount coupled to an instrument panel support bracket, in accordance with a non-limiting example.

Referring to FIG. 2 and with continued reference to FIG. 1, display 36 is arranged in passenger compartment 20 laterally spaced from steering control 30. towards, for example, a passenger seat (not shown). That is, display 36 may be centrally located on dashboard 26. Display 36 is supported by an energy attenuating display mount 42 that is connected to an instrument panel support beam 45 (FIG. 3) disposed in dashboard 26. In a non-limiting example, energy attenuating display mount 42 includes an instrument panel support bracket 47 that is connected to instrument panel support beam 45. Instrument panel support bracket 47 may be moveably mounted to instrument panel support beam 45 to allow for adjustment of display 36. Instrument panel support bracket 47 may include multiple instrument panel support bracket elements 50 such as shown in FIG. 4.

A display mount 52, including a display support surface 54, is connected to instrument panel support bracket 47 through a plurality of energy attenuating fasteners such as shown at 56. Display mount 52 serves as an interface between display 36 and instrument panel support bracket 47. Energy attenuating fasteners 56 facilitate some amount of give or forward movement of display 36 if contacted by a driver and/or a passenger during a crash. The forward movement absorbs impact forces in order to mitigate injury.

Figure 5:
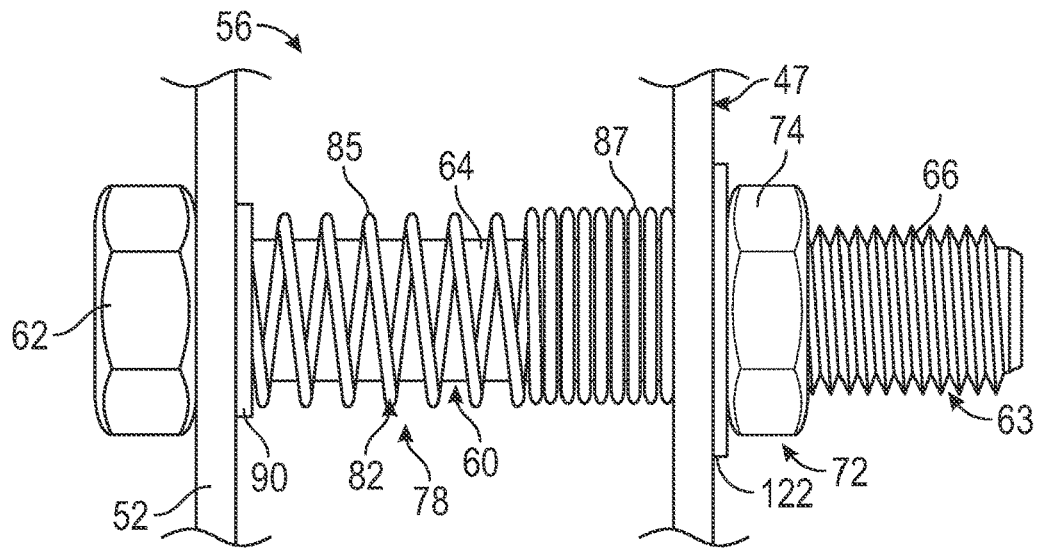
FIG. 5 is a side view of an energy attenuating fastener of the an energy attenuating display mount, in accordance with a non-limiting example.
Figure 6:
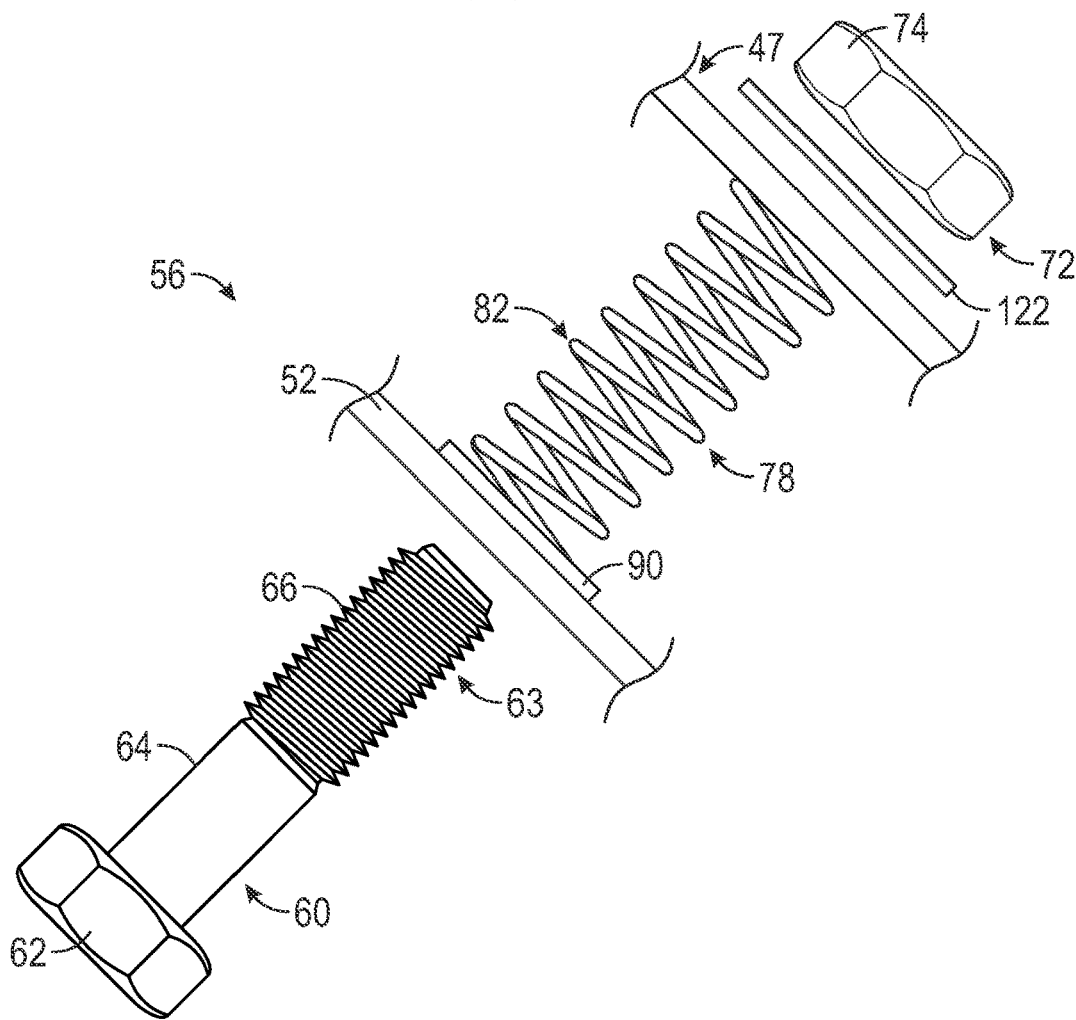
FIG. 6 is a disassembled view of the energy attenuating fastener of FIG. 5, in accordance with a non-limiting example.

Referring to FIGS. 5 and 6, and with continued reference to FIG. 2, energy attenuating fastener 56 includes a fastener member 60 having a head 62 and a shank 63. Shank 63 includes an unthreaded portion 64 and a threaded portion 66. A fastener element 72, such as a nut is connected to threaded portion 66. Fastener element 72 serves as a travel limiter 74 as will be detailed more fully herein. A biasing member 78 is provided on shank 63 between head 62 and fastener element 72. More specifically, biasing member 78 is disposed between display mount 52 and fastener element 72.

In a non-limiting example, biasing member 78 takes the form of a coil spring 82 which, when installed, includes a plurality of active coils 85 and a plurality of compressed coils 87. Active coils 85 allow for forward deflection of display 36. Compressed coils 87 establish a selected preload on fastener member 60. A washer 90 may be disposed between biasing member 78 and display mount 52. Washer 90 distributes loads from biasing member 78 to display mount 52.

Reference will now follow to FIGS. 7A-7D in describing a method of mounting display 36 in vehicle 10. Initially, display mount 52 is positioned adjacent to instrument panel support bracket 47 as shown in FIG. 7A. When in position, a plurality of first openings 93 having a first diameter formed in display mount 52 align with a plurality of second openings 98 having a second diameter in instrument panel support bracket 47. In a non-limiting example, the first diameter is smaller than a diameter of head 62. The second diameter is, as will be detailed herein, larger than an outer diameter of coil spring 82.

When aligned, fastener member 60 is passed through first opening 93 with head 62 abutting display mount 52 as shown in FIG. 7B. Of course, it should be understood that a washer (not shown) may be present between head 62 and display mount 52. As also shown in FIG. 7B threaded portion 66 of shank 63 passes through second opening 98. At this point, biasing member 78 is installed through second opening 98 onto shank 63 as shown in FIG. 7C. A washer 90 may be arranged between biasing member 78 and display mount 52.

After biasing member 78 is installed, fastener element 72 is connected to threaded portion 66 as shown in FIG. 7D. Fastener element 72 includes a diameter that is greater than the second diameter of second opening 98. A washer 122 may be installed between fastener element 70 and instrument panel support bracket 47. Fastener element 72 may then be tightened to compress coil spring 82 forming active coils 85 and compressed coils 87. Fastener element 72 further establishes a length of travel of fastener member 60. The degree of tightening may vary and could depend upon a spring constant of coil spring 82 and a desired length of travel. At this point, display 36 is secured to dashboard 26 while, at the same time, being permitted forward, impact absorbing or attenuating movement provided by compressing active coils 85 of biasing member 78.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An energy attenuating vehicle display mount comprising:
    an instrument panel support mounted to a dashboard;
    an instrument panel support bracket coupled to the instrument panel support;
    a display mount coupled to the instrument panel support bracket; and
    an energy attenuating fastener connecting the display mount to the instrument panel support bracket, the energy attenuating fastener accommodating compressive movement of the display mount toward the instrument panel support bracket;
    wherein the energy attenuating fastener includes a fastener member and a biasing member that absorbs the compressive movement;
    wherein the display mount includes a first opening having a first diameter and the instrument panel support bracket a second opening having a second diameter, the energy attenuating fastener extending through each of the first opening and the second opening; and
    wherein the biasing member comprises a coil spring having a third diameter that is less than the second diameter and greater than the first diameter.

2. The energy attenuating vehicle display mount according to claim 1, wherein the energy attenuating fastener includes a travel limiter arranged at the second opening, the travel limiter having a fourth diameter that is greater than the second diameter.

3. The energy attenuating vehicle display mount according to claim 2, wherein the energy attenuating fastener includes a threaded section and the travel limiter includes a threaded portion that engages with the threaded section.

4. The energy attenuating vehicle display mount according to claim 2, wherein the coil spring abuts each of the display mount and the travel limiter.

5. The energy attenuating vehicle display mount according to claim 4, wherein the coil spring includes a plurality of active coils and a plurality of compressed coils.

6. A vehicle comprising:
    a body defining a passenger compartment;
    a plurality of wheels supporting the body;
    a seat arranged in the passenger compartment;
    a dashboard arranged in the passenger compartment;
    a steering control arranged between the seat and the dashboard, the steering control being connected to at least one of the plurality of wheels;
    a display supported by the dashboard, the display being laterally offset relative to the steering control; and
    an energy attenuating mount connecting the display to the dashboard, the energy attenuating mount comprising:
        an instrument panel support mounted to the dashboard;
        an instrument panel support bracket coupled to the instrument panel support;
        a display mount coupled to the instrument panel support bracket; and
        an energy attenuating fastener connecting the display mount to the instrument panel support bracket, the energy attenuating fastener accommodating compressive movement of the display mount toward the instrument panel support bracket;
    wherein the energy attenuating fastener includes a fastener member and a biasing member that absorbs the compressive movement;
    wherein the display mount includes a first opening having a first diameter and the instrument panel support bracket includes a second opening having a second diameter, the energy attenuating fastener extending through each of the first opening and the second opening; and
    wherein the biasing member comprises a coil spring having a third diameter that is less than the second diameter and greater than the first diameter.

7. The vehicle according to claim 6, wherein the energy attenuating fastener includes a travel limiter arranged at the second opening, the travel limiter having a fourth diameter that is greater than the second diameter.

8. The vehicle according to claim 7, wherein the energy attenuating fastener includes a threaded section and the travel limiter includes a threaded portion that engages with the threaded section.

9. The vehicle according to claim 7, wherein the coil spring abuts each of the display mount and the travel limiter.

10. The vehicle according to claim 8, wherein the coil spring includes a plurality of active coils and a plurality of compressed coils.

11. A method of mounting a display in a vehicle comprising:
    positioning a display mount adjacent an instrument panel support bracket coupled to a dashboard;
        passing an energy attenuating fastener through first opening in the display mount and a second opening in the instrument panel support;
        installing a biasing member through the second opening onto the energy attenuating fastener, the biasing member being configured to absorb compressive movement of the display mount toward the instrument panel support; and
        securing the biasing member with a travel limiter coupled to the energy attenuating fastener at the second opening;
    wherein securing the biasing member includes threading the travel limiter onto the energy attenuating fastener; and wherein threading the travel limiter onto the energy attenuating fastener includes compressing the biasing member to form a plurality of compressed coils and a plurality of active coils.

12. The method of claim 11, further comprising: connecting a display to the display mount.

* * * * *